(12) United States Patent
Hwang et al.

(10) Patent No.: US 8,240,728 B2
(45) Date of Patent: Aug. 14, 2012

(54) AUTOMATED SHACKLE ASSEMBLY

(75) Inventors: In Kyu Hwang, Chungcheongnam-do (KR); Jong Won Park, Daejeon (KR)

(73) Assignee: P&H Co., Ltd, Chungcheongnam-Do (KR)

( * ) Notice: Subject to any disclaimer, the term of this patent is extended or adjusted under 35 U.S.C. 154(b) by 0 days.

(21) Appl. No.: 13/142,107

(22) PCT Filed: Dec. 24, 2008

(86) PCT No.: PCT/KR2008/007691
§ 371 (c)(1),
(2), (4) Date: Jun. 24, 2011

(87) PCT Pub. No.: WO2010/074360
PCT Pub. Date: Jul. 1, 2010

(65) Prior Publication Data
US 2011/0254300 A1    Oct. 20, 2011

(51) Int. Cl.
*B66C 1/38* (2006.01)
(52) U.S. Cl. .................. 294/82.35; 294/82.23
(58) Field of Classification Search ........... 294/82.23, 294/82.35, 82.1; 59/85, 86; 114/114; 24/369, 24/371, 600.7
See application file for complete search history.

(56) References Cited

U.S. PATENT DOCUMENTS

| | | | | |
|---|---|---|---|---|
| 2,489,864 A * | 11/1949 | Cravener | .................... | 294/82.35 |
| 3,646,645 A * | 3/1972 | Bauer | ........................ | 294/82.35 |
| 4,075,966 A * | 2/1978 | Bates et al. | ................. | 294/82.35 |
| 4,348,043 A | 9/1982 | Fandel | | |
| 4,453,622 A * | 6/1984 | Betz | ........................... | 294/82.35 |
| 6,896,305 B1 * | 5/2005 | Wu et al. | .................... | 294/82.24 |
| 7,614,209 B1 * | 11/2009 | Payne et al. | ....................... | 59/86 |

FOREIGN PATENT DOCUMENTS

| | | |
|---|---|---|
| JP | 8-91765 | 4/1996 |
| KR | 1998-022332 | 7/1998 |
| KR | 1999-0033087 | 5/1999 |
| KR | 10-2006-0066680 | 6/2006 |
| KR | 10-0775259 B1 | 11/2007 |
| KR | 10-2008-0000757 A | 1/2008 |

OTHER PUBLICATIONS

Abstract of KR 10-0149141 B1, dated Oct. 15, 1998.
Abstract of KR 10-0261406 B1, dated Jul. 1, 2000.
Abstract of KR 2007-0100080 A, dated Oct. 10, 2007.
International Search Report dated Sep. 29, 2009 issued in PCT/KR2008/007691.

* cited by examiner

*Primary Examiner* — Paul T Chin
(74) *Attorney, Agent, or Firm* — Scully, Scott, Murphy & Presser, P.C.

(57) ABSTRACT

A shackle assembly may be used for delivering a steel structure in a construction field, the shackle assembly including a shackle body, first, second, and third shackle pins, first and second elastic means, a vertical movement mean, and a control means. Thanks to the plurality of shackle pins and the plurality of elastic means, the shackle assembly can reduce its weight and manufacturing cost. Also, in spite of the light weight and the low cost of the shackle assembly, stability and efficiency in its working can be sufficiently secured.

7 Claims, 11 Drawing Sheets

PRIOR ART

PRIOR ART

PRIOR ART

AUTOMATED SHACKLE ASSEMBLY

TECHNICAL FIELD

The present invention relates to an automated shackle assembly, which is used for delivering a steel structure, such as an H steel structure, etc. in a construction field, and more particularly to an automated shackle assembly, which can be simply and safely separated from a steel structure through a remote control operation of a remote controller.

BACKGROUND ART

A construction industry has recently kept pace with construction of futuristic buildings, which have become larger and multifunctional. Also, due to limited site conditions, buildings have a tendency to be constructed with high floors and with underground floors. Therefore, a steel construction process for constructing basic steel structures has been recognized as the most important construction process among construction processes for a large-sized building in accordance with the tendency of a recent construction industry. The steel construction process is an essential process of the construction processes for large-sized buildings and is a process for constructing frames of the buildings. The basic work of such a steel construction is to pull up various steel structures by using a tower crane installed at a construction site and to assemble the steel structures up to a desired floor by workers.

In order to set up such a steel structure, first, a steel structure has to be connected to a tower crane, etc. by using a shackle assembly, etc. That is, as shown in FIG. 1, connection members 120 having each assembling hole 121 are welded to both sides of an upper end of a steel structure 110, respectively. A shackle body 131 included in a shackle assembly 130 is fixedly assembled with the connection members 120 through an assembling hole 121 by using a shackle pin 132 and a nut 133, and then, a hook 140 of the tower crane is connected with the shackle body 131.

Then, after the steel structure 110 connected with the hook 140 of the crane is pulled up, the steel structure 110 is accurately moved to an assembling position to be temporarily assembled. Then, the worker climbs to an upper part of the steel structure 110 and separates the shackle assembly 130 from the steel structure 110.

DISCLOSURE

[Technical Problem]

However, in the conventional construction method, a work of separating the shackle assembly 130 from the steel structure 110 is manually performed. That is, the worker has to climb to the top of the steel structure 110 connected with the crane to perform the separation work. Therefore, the conventional construction method has a problem of serious safety risk, such as a worker accidentally falling, etc. as well as a problem of reduction of work efficiency.

As a technique used for resolving such a problem, there are remote control apparatus for H beam clamp shackle disclosed in Korea Patent laid-open No. 1998-022332, automatic opening/closing type electric hook disclosed in Korea Patent laid-open No. 1999-0033087, and automated shackle assembly disclosed in Korea Patent laid-open No. 2006-0066680. These disclosed inventions are structured in such a manner that they can be automatically separated from a steel structure connected to a crane through the remote control operation.

According to the technique disclosed in Korea Patent laid-open No. 1998-022332, a shackle pin of a conventional shackle assembly, which is opened or closed by a handle operation, is moved in a left-right direction so that a steel structure connected with a crane can be automatically separated from the crane. However, in this technique, the conventional shackle assembly has a complicated configuration, and a configuration for connecting the shackle assembly to a remote control apparatus is further added to the configuration of the shackle assembly. Therefore, the whole configuration of the shackle assembly is too complicated, and the shackle assembly is too heavy.

According to the technique disclosed in Korea Patent laid-open No. 1999-0033087, a supporting member is moved in a right-left direction through a gear train mechanism according to a remote control signal, and as a separated safety apparatus for controlling an erroneous operation performed by a worker, a load cell for detecting the weight of a steel structure is included. Therefore, the steel structure can be automatically separated from a crane in a safety state through this technique. However, this technique has a disadvantage in that its cost is higher due to an expensive load cell included therein.

Meanwhile, the technique disclosed in Korea patent laid-open No. 2006-0066680 is invented by the inventor of this present invention. As shown in FIGS. 12 and 13, in a shackle assembly 300, a vertical movement means 350 is moved in a lower direction to be inserted into a fixing hole formed on a shackle pin 330 so that the shackle pin 330 intersects a shake body 320 to be in a closed state (see FIG. 13). However, when the vertical movement means 350 is moved in an upper direction (see FIG. 12), the shackle pin 330 slides due to elastic force of an elastic body 340 so that the shackle assembly can be separated from a steel structure.

However, in this technique, as a means for keeping the shackle pin 330 in a closed state as shown in FIG. 13, there is only one vertical movement means. But, in general, a considerable amount of restoration force is required in order to open the shackle pin 330. If the fixing means of the vertical movement means 350 independently bears such restoration force, the amount of load given to the vertical movement means 350 becomes larger. Therefore, in order to give a larger amount of force against the load, the volume of the configuration of the shackle assembly becomes larger (capacity of a battery and gear trains are used, etc.). If restoration force is smaller, it is difficult to smoothly open the shackle pin 330 due to the frictional force exerted on the shackle pin 330.

Moreover, there is only one elastic means 340 for restoring the state of the shackle pin 330 to an open state. Therefore, superior elastic force is required in the elastic means 340. As such, there is a problem in that the configuration of the shackle assembly becomes heavier and complicated in order to implement the vertical movement means 350 and the elastic means 340, which satisfy such a large amount of load and superior elastic force.

[Technical Solution]

Therefore, the present invention has been made in view of the above-mentioned problems, and it is an object of the present invention to provide an automated shackle assembly, in which a release of engagement of a vertical movement means by a remote controller can cause a shackle pin to slide due to elastic force provided by an elastic body and the automated shackle assembly to be separated from a steel structure, so that the automated shackle assembly can reduce the required weight of the vertical movement means and the required elastic force of an elastic means, can reduce its weight and manufacturing cost, and can secure safety in working in spite of the light weight and the low cost.

According to an aspect of the present invention, there is provided an automated shackle assembly including: a shackle body having an open part allowing a part of a steel structure to be inserted into the open part and to be supported by the shackle body; a first shackle pin, which opens or closes the open part in such a manner that the first shackle pin linearly moves while intersecting the open part of the shackle body so as to support the steel structure; a first elastic means for providing elastic force required for opening the open part by the first shackle pin; a protrusion for holding the first shackle pin in a closed state; a second elastic means for providing force required for releasing the closed state of the protrusion; a second shackle pin, which selectively makes contact with the first shackle pin and delivers force to the first shackle pin in a closing direction when the open part of the shackle body is closed, and receives elastic energy stored in the second elastic means and moves in an opening direction when the closed open part is opened; a third shackle pin, which is arranged between the first shackle pin and the second shackle pin and receives force from the second shackle pin, which is moved by obtaining elastic energy provided from the second elastic means when the open part is opened, thereby releasing a held state of the protrusion; and a vertical movement means, which vertically and linearly move according to power from an electric power supply means fixed in one side of the shackle body or restoration force provided from an elastic means so as to allow the first shackle pin to close or open the open part of the shackle body so that the vertical movement means is engaged with one side of the second shackle pin or is released from the one side through communication with a first open part included in one side of the first shackle pin.

The automated shackle assembly according to the present invention may further include a control means for controlling the electric power supply means according to a remote control signal from the outside.

The first shackle pin may have a first open part formed at one side thereof, and the second shackle pin may have a holding recess formed on one side of an end thereof. Therefore, when the second elastic means is compressed, the holding recess and the first open part can be aligned with each other.

Also, it is preferred that the vertical movement means has a holding pin, which vertically moves and passes through the first open part to be engaged with the holding recess when the first and second shackle pins close the open part of the shackle body or to be released from the holding recess.

The shackle body includes first and second supporting parts and a through-hole for allowing the first shackle pin to linearly move through the first and second supporting parts.

Also, the second supporting part includes an elastic member for applying elastic force to the protrusion so as to allow the protrusion to protrude out of a lower part of the through-hole, and the first shackle pin includes a second open part, into which the protrusion is inserted by elastic force provide from the elastic member when the first shackle pin closes the open part of the shackle body.

Also, an inclined surface is formed at one side of an end of the third shackle pin, and an inclined surface corresponding to the inclined surface of the third shackle pin is formed at the protrusion so that the inclined surface of the protrusion is engaged with the inclined surface of the third shackle pin when the protrusion passes through the second open part.

Also, an inclined surface to be engaged with the inclined surface of the third shackle pin may be formed at one end of the first shackle pin.

Also, it is preferred that the automated shackle assembly further includes a housing fixed in an outer side of the shackle body, the housing receiving the first shackle pin and the first elastic means and restricting movement of the first shackle pin, which is performed due to elastic force provided from the first elastic means.

According to the present invention, a plurality of shackle pins and a plurality of elastic means are included so that the load required for the vertical movement means and elastic force required for the elastic means can be reduced.

That is, according to the present invention, the protrusion 224 supports the first elastic means 241 for providing a large amount of restoration force required for opening the shackle pin 230, and as force required for releasing the protrusion 224, electric energy isn't used, but elastic energy stored in the second elastic means 242 through human power is used. Accordingly, the fixing pin 251 of the vertical movement means 250 supports a comparatively small amount of restoration force of the second elastic means 242 so that the burden given to the vertical movement means 250, which is required for controlling the second elastic means 242, is significantly reduced. Therefore, the structure of the shackle assembly can be simplified. Also, impact force generated when the protrusion 224 is released by elastic energy provided from the second elastic means 242 acts as force required for overcoming static friction force acting against the opening operation of the first shackle pin 231 so that the first elastic means 241 allows the first shackle pin 231 to perform an opening operation. Therefore, restoration force required in the first elastic means can be reduced.

[Advantageous Effects]

According to the present invention, a plurality of shackle pins and a plurality of elastic means are included so that the load required for the vertical movement means and elastic force required for elastic means can be reduced.

That is, according to the present invention, the protrusion 224 supports the first elastic means 241 for providing a large amount of restoration force required for opening the shackle pin 230, and as force required for releasing the protrusion 224, electric energy stored in the second elastic means 241 isn't used, but elastic energy stored in the second elastic means 242 through human power is used.

Accordingly, the holding pin 251 of the vertical movement means 250 relates to a comparatively small amount of restoration force of the second elastic means 242 so that burden given to the vertical movement means 250, which is required for controlling the second elastic means 242, is reduced significantly. Therefore, the structure of the shackle assembly can be simplified.

Also, the protrusion 224 is released by impact force generated by elastic energy provided from the second elastic means. The first elastic means 241 acts as force required for overcoming static friction force acting against the opening operation of the first shackle pin 231 and allows the first shackle pin 231 to perform an opening operation. Therefore, a large amount of restoration force can be provided in the first elastic means 241 without giving any burden to the vertical movement means 250.

DESCRIPTION OF DRAWINGS

The foregoing and other objects, features and advantages of the present invention will become more apparent from the following detailed description when taken in conjunction with the accompanying drawings in which.

BEST MODE

Hereinafter, embodiments of the present invention will be described below in detail with reference to accompanying drawings.

Figure 2:
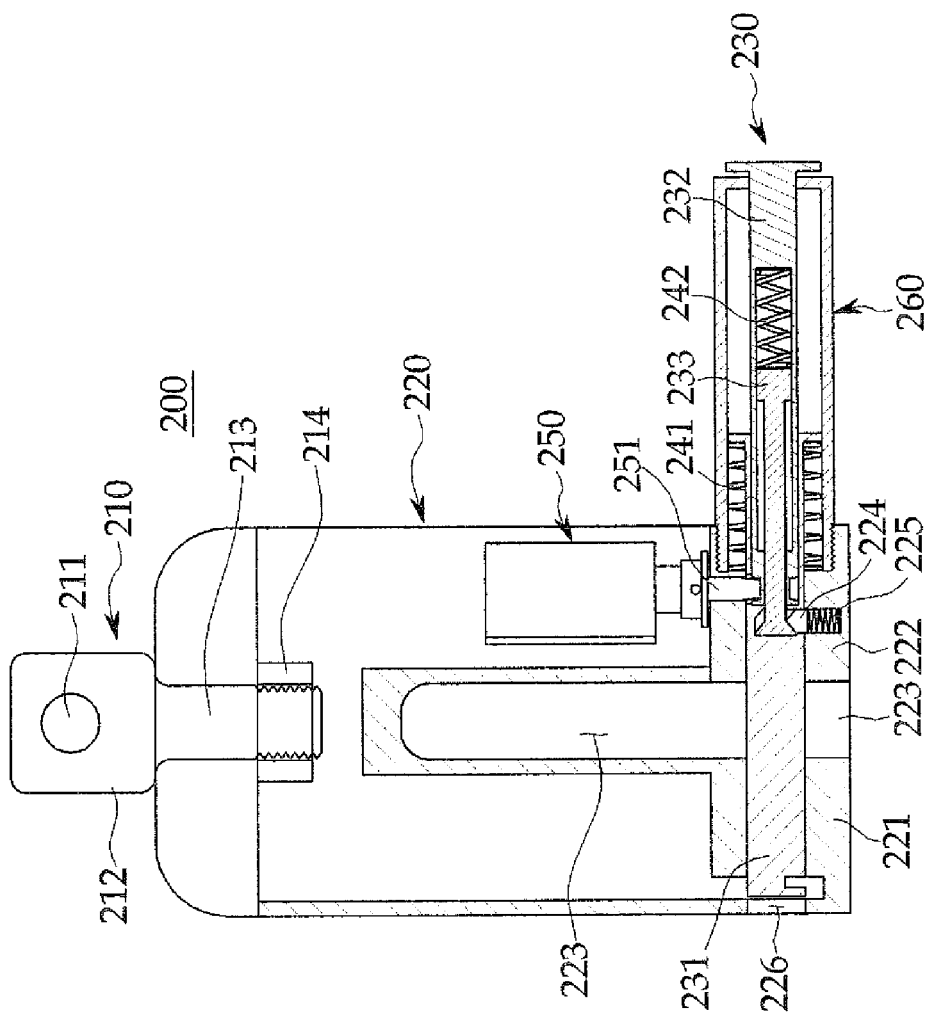
FIGS. 2 and 3 are schematic section views of an automated opening type shackle assembly according to an embodiment of the present invention.
Figure 3:
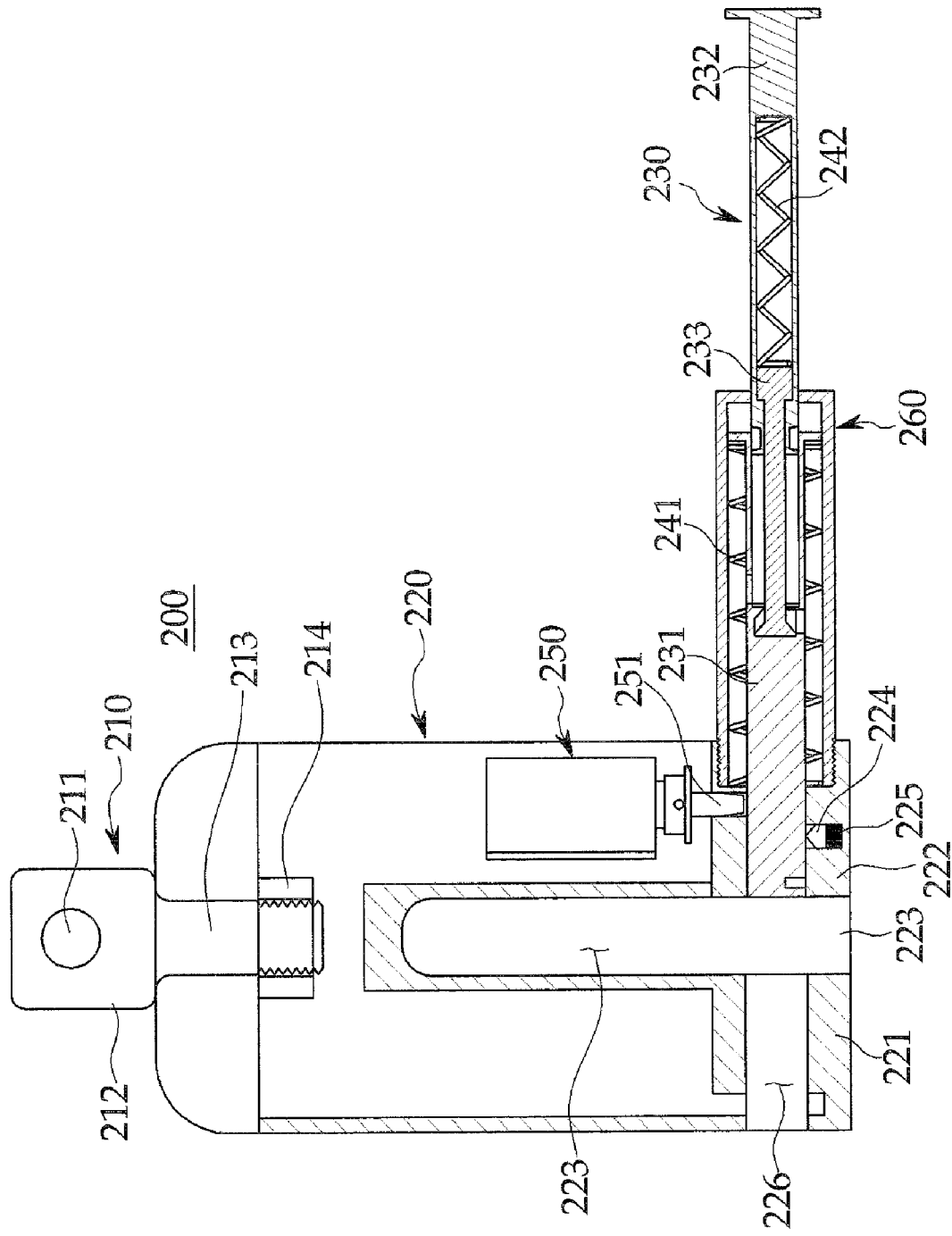

As shown in FIGS. 2 and 3, an automated shackle assembly 200 according to this embodiment comprises a shackle body 220 having an open part 223 allowing a part of a steel structure to be inserted into the open part and to be supported by the shackle body; a first, second, and third shackle pin 231, 232, and 233 which opens or closes the open part 223 in such a manner that the first, second, and third shackle pin linearly move while intersecting the open part 223 of the shackle body 220 so as to support the steel structure; a first elastic means 241 and a second elastic means 242; a vertical movement means 250; and a control means for general control such as delivering electric power of an electric power supply means to the vertical movement means 250 according to a remote control signal from an outside.

According to the present invention, the shackle pin 230 includes three parts, i.e. the first, second, and third shackle pin 231, 232, and 233.

Also, since the shackle pins are included in plurality, the elastic means 240 (particularly, the first elastic means 241 and the second elastic means 242) for restoring the shackle pins in an opened state are also included in plurality.

A housing 260 is included at the outside of the second shackle pin 232 and the second elastic means 242 so as to prevent the second shackle pin 232 and the second elastic means 242 from deviating from the shackle body 220 beyond a certain range.

As shown in FIGS. 2 and 3, a hole 211, through which the hook hanger part is hung on a hook, etc. of a crane, is formed on an upper part 212 of the hook hanger part 210. Also, a lower part 213 of the hook hanger part 210 is inserted into a hole formed at the top of the shackle body 220 and is fixed by a predetermined assembling means 214, such as a screw and a nut.

Referring to FIGS. 2 and 3, the shackle body 220 has a part to be assembled with the lower part 213 of the hook hanger part 210 and has first and second supporting part 221 and 222, by which an inserted supporting part of a steel structure can be supported. At this time, an open part 223 is formed between the first and second supporting parts 221 and 222 while having an interval allowing the supporting part of the steel structure to be inserted through the open part.

Also, a hole, into which the lower part 213 of the hook hanger part 210 is inserted, is formed at upper parts of the first and second supporting parts 221 and 222, and a through-hole 226 extending through the open part 223 in a left-right direction is formed at each lower part of the first and second supporting parts 221 and 222. At this time, it is preferred that the though hole 226 has a cross section of a circular shape.

Space for installation of the vertical movement means 250 is formed on the interior of the second supporting part 222. This space allows a holding pin 251, which is a portion of the vertical movement means 250, to move in an up-down direction without limitation. Therefore, the holding pin 251 moves to a lower part of the second supporting part 222 along an inner space of the second supporting part 222 so that an end of the holding pin 251 protrudes toward the through-hole 226, i.e. the end is inserted into one side of the first and second shackle pins 231 and 232, so as to fix the shackle pin 230. Meanwhile, the holding pin 251 is moved to an upper part of the second supporting part so as to allow the end of the holding pin to be positioned within the inner space of the second supporting part 222, thereby releasing the connection between the end of the holding pin and the shackle pin 230 (particularly, the first and second shackle pins 231 and 232).

Figure 7:
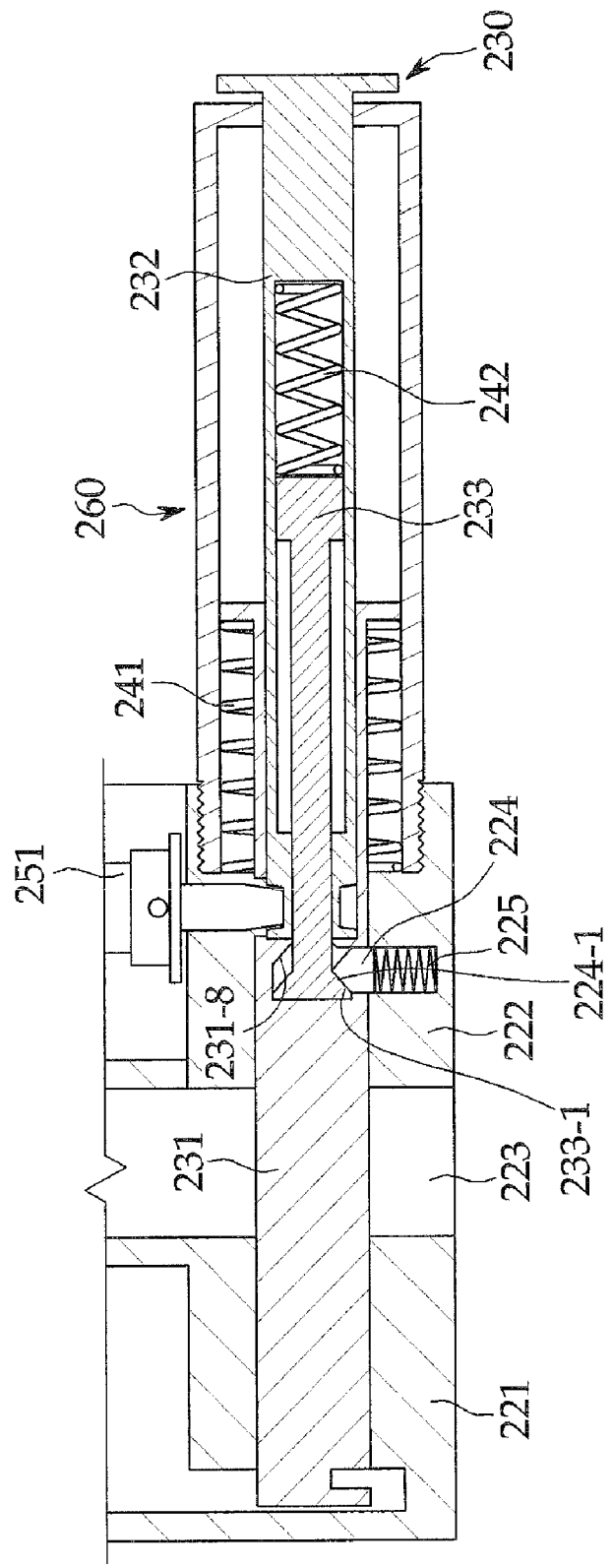

Moreover, one protrusion 224, which protrudes from a lower corner of the through-hole, is formed at the second supporting part 222. The protrusion 224 is in a state where pressure is exerted in an upwards direction by an elastic member 225. Therefore, as shown in FIGS. 2 and 7, when the shackle pin 230 is in a closed state where it intersects the open part 223 of the shackle body 220, the protrusion 224 is inserted into a second open part 231-2 formed on the first shackle pin 231 of the shackle pin 230 so as to maintain the closed state of the first shackle pin 231.

Meanwhile, FIGS. 2, 3, and 4 to 7, the shackle pin 230 according to the present invention includes three parts, i.e. the second shackle pin 232 as an outermost part, the first shackle pin 231, which is arranged at inner side closer to the shackle body 220 than the second shackle pin 232 and intersects the open part 223; and a third shackle pin 233 arranged between the first shackle pin 231 and the second shackle pin 232.

The first shackle pin 231 is a part intersecting the first and second supporting parts 221 and 222 of the shackle body 220. Therefore, the first shackle pin 231 has a length long enough to intersect the first and second supporting parts 221 and 222 to be positioned, and also has a size and a shape allowing the first shackle pin to smoothly perform a reciprocal and linear movement in a left-right direction while extending through the through-hole 226.

Figure 9:
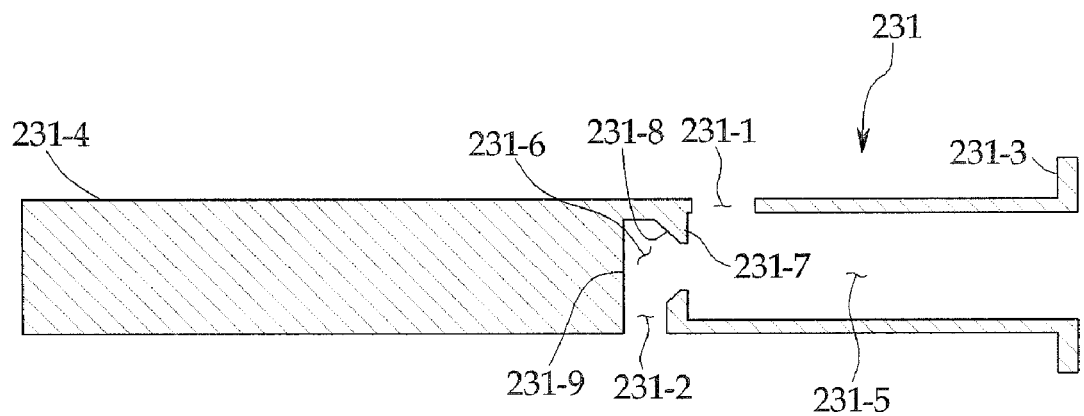
FIG. 9 is a section view of a first shackle pin according to an embodiment of the present invention, in which the structure of the first shackle pin is shown in detail.

Referring to FIG. 9, the first shackle pin 231 is a member with a hollow cylindrical shape, which has one open end 231-3 and the other closed end 231-4. The second shackle pin 232 and the third shackle pin 233 are inserted into a first inner space 231-5 and seated thereon. An end part 233-4 of the third shackle pin 233 is arranged in a second inner space 231-6. An inclined surface 231-8 is formed at a boundary part 231-7 between the first and second inner space 231-5 and 231-6, and is shaped to be engaged with an inclined surface 233-1 of the third shackle pin 233, which will be described below.

Moreover, as shown in FIG. 9, a first open part 231-1 and the second open part 231-2 are formed at the first shackle pin 231. The first open part 231-1 functions as a communication hole allowing the holding pin 251 of the vertical movement means 250 to be inserted into a holding recess 232-1 of the second shackle pin 232. The protrusion 224 included in the second supporting part 222 of the shackle body 220 is inserted into the second open part 231-2.

When closing the open part 223, the second shackle pin 232 selectively makes contact with the first shackle pin 231 to deliver force to the first shackle pin 231 in the direction where the first shackle pin 231 closes the open part 223. Meanwhile, when opening the open part 223, the second shackle pin 232 delivers energy stored in the second elastic means 242 to the third shackle pin 233.

Figure 10:
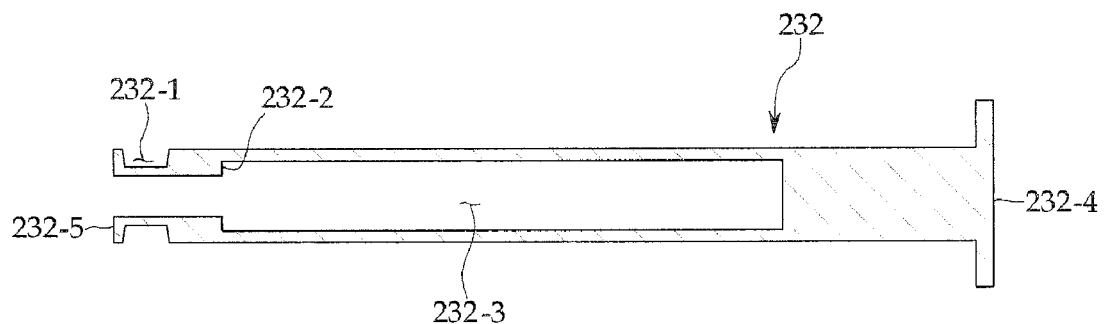
FIG. 10 is a section view of a second shackle pin according to an embodiment of the present invention, in which the structure of the second shackle pin is shown in detail.

Referring to FIG. 10, it is preferred that the second shackle pin 232 is the outermost pin of three shackle pins, and has a hollow cylindrical shape, which has one closed end 232-4 and the other open end 232-3. An inner space 232-3, in which the second elastic means 242 is arranged, is formed inside of the second shackle pin 232. Also, a stepped part 232-2 for delivering force to the third shackle pin 233 is formed in the inner space 232-3 in a direction of the other end 232-5.

Moreover, the second shackle pin 232 has the holding recess 232-1, into which the holding pin 251 of the vertical movement means 250 is inserted and fixed. The holding recess 232-1 preferably has a size larger than that of the holding pin 251 so as to allow the holding pin 251 to be smoothly inserted thereinto.

The third shackle pin 233 is arranged between the first shackle pin 231 and the second shackle pin 232 to as to release the locked state of the protrusion 224 by receiving force from the second shackle pin 232, which is moved by receiving elastic energy from the second elastic means 242.

Figure 11:
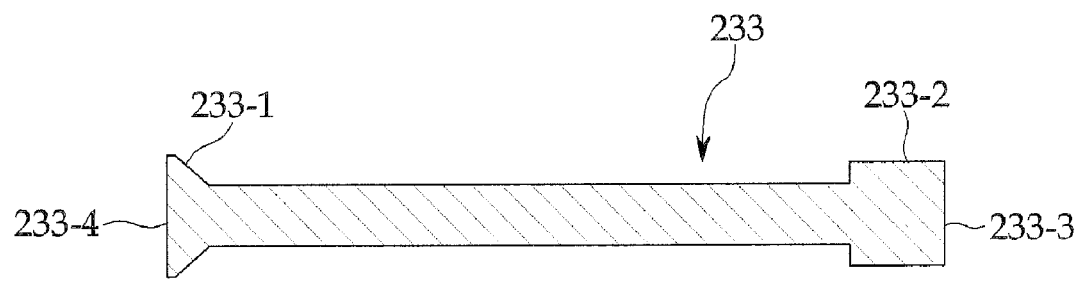
FIG. 11 is a section view of a third shackle pin according to an embodiment of the present invention, in which the structure of the third shackle pin is shown in detail.
Figure 12:
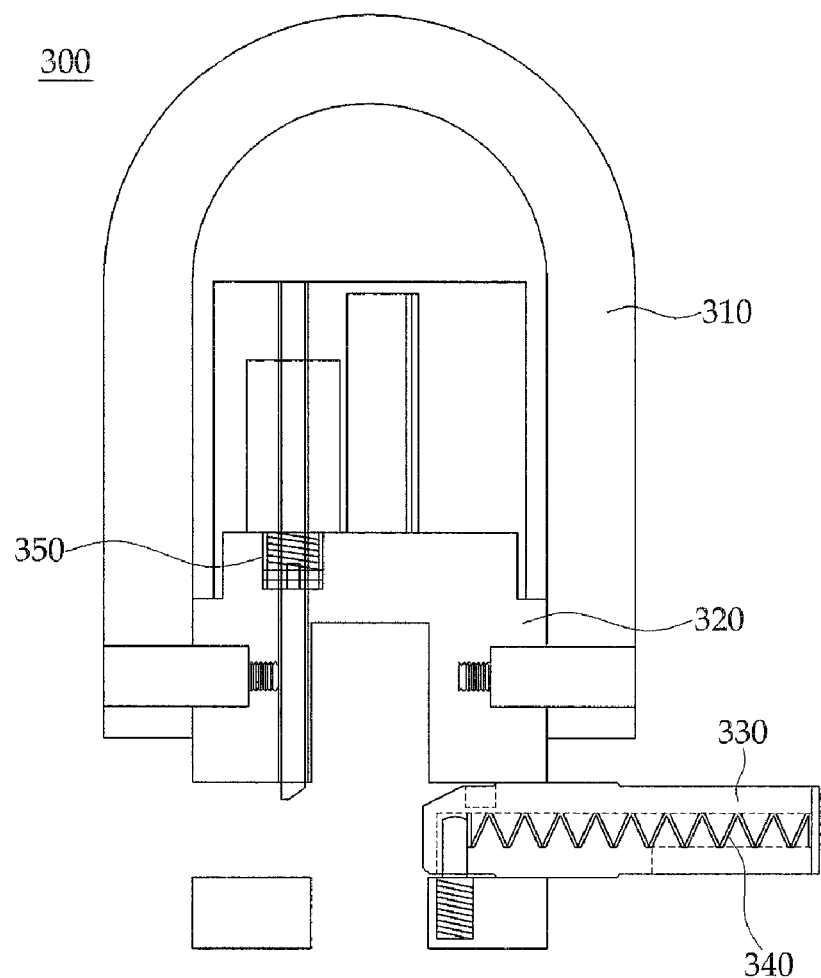
FIGS. 12 and 13 are schematic views showing the structure of a conventional shackle assembly.
Figure 13:
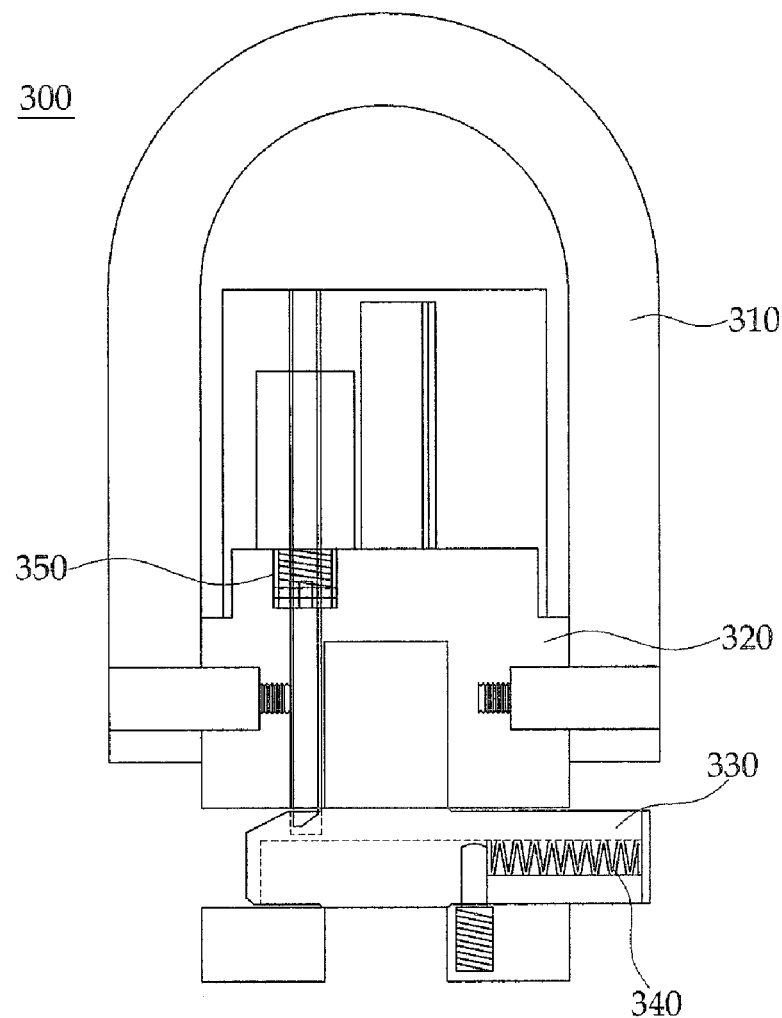

Referring to FIG. 11, it is preferable that the third shackle pin 233 has a rod-shape and a cross section of a circular shape. An end part 233-3 of the third shackle pin 233 is arranged in the inner space 232-3 of the second shackle pin 232 and makes contact with the second elastic means 242 (see FIGS. 4 to 8, and 10). The other end part 233-4 of the third shackle pin 233 is positioned in the second inner space 231-6 of the first shackle pin 231. The inclined surface 233-1 is formed at the other end 233-4 of the third shackle pin 233 so that the protrusion 224 is pushed along the inclined surface when the third shackle pin 233 moves to the outer side based on the shackle body 220. Also, the inclined surface 233-1 has a shape corresponding to the slanted surface 231-8 of the first shackle pin 231.

Meanwhile, the elastic means 240 according to the present invention includes the first elastic means 241 and the second elastic means 242.

As shown in FIGS. 4 to 7, the first elastic means 241 is seated between the outer surface of the second supporting part 222 of the shackle body 220 and the one end 231-3 of the first shackle pin 231 so that the first elastic means 241 provides elastic force to allow the first shackle pin 231 to open the open part 223 of the shackle body 220.

Referring to FIGS. 4 to 7, the second elastic means 242 is positioned in the inner space 232-3 in such a manner that it is arranged between the second shackle pin 232 and the third shackle pin 233. Therefore, the second elastic means 242 provides force required for pushing the protrusion 224 out of the first shackle pin 231 through the second shackle pin 232 and the third shackle pin 233.

Meanwhile, as shown in present embodiment, coil springs may be used as the first elastic means 241 and the second elastic means 242. At this time, each coil spring is embedded in a state where it is lightly compressed and is again restored. That is, as shown in FIG. 2, when the shackle pin 230 closes the open part 223 of the shackle body 220, the coil spring is compressed. Meanwhile, as shown in FIG. 3, when the open part 223 is opened, the coil spring is restored to an original state.

The vertical movement means 250 linearly and reciprocally move in an up-down direction due to power supplied from the electric power supply means fixed in one lower side of the shackle body 220 or restoration force provided from the elastic means, and is locked in the holding recess 232-1 of the second shackle 232 or is released therefrom by communicating with the first open part 231-1 of the first shackle 231.

It is preferred that the upwards movement of the vertical movement means 250 is operated by power supplied from the electric power supply means, and the downwards movement of the vertical movement means 250 is operated by restoration force provided from the elastic means. A solenoid valve may be used as the upwards movement means of the vertical movement means 250.

That is, the holding pin 251 of the vertical movement means 250 is moved downwards due to restoration force provided from the elastic means so that an end of the holding pin 251 is inserted and locked into the holding recess 232-1 of the second shackle pin 232. According to power supplied from the electric power supply means, the solenoid valve allows the holding pin 251 of the vertical movement means 250 to move upwards so that the end of the holding pin 251 is moved upwards and released from the holding recess 232-1. As a result, connection between the vertical movement means 250 and the second shackle pin 232 is released.

The control means is embedded in the upper end of the shackle body 220 through a separate cover and includes a reception unit for receiving a remote control signal from the outside and a control circuit unit for performing overall control operations including an operation for applying power from the electric power supply means to the vertical movement means 250 according to a signal received in the reception unit, etc. Also, the control means can display a work state through a displaying means, e.g. an LED light. Also, the control means can display the state of a battery of the electric power supply means through other display means to allow a worker to check the state.

Figure 1:
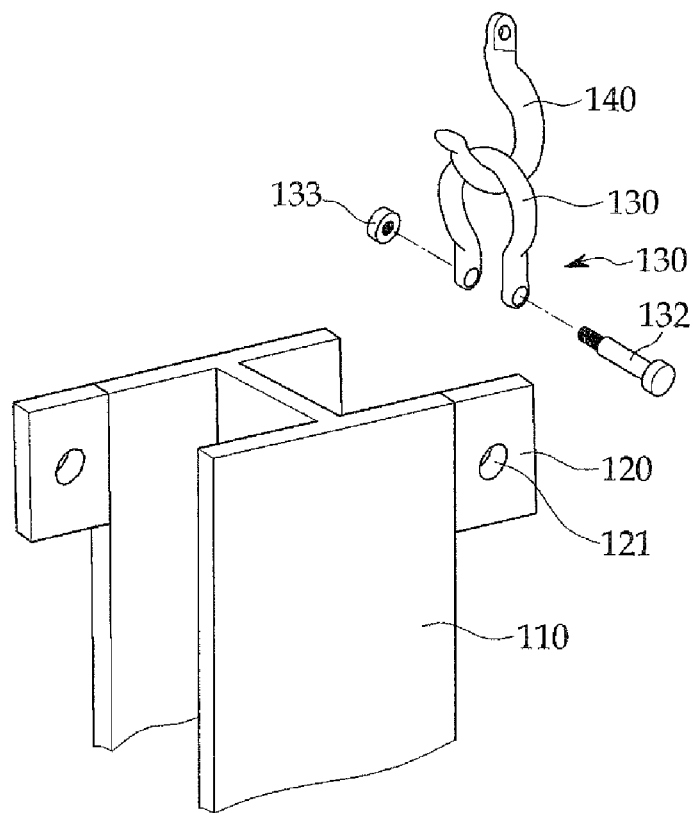
FIG. 1 is a schematic view showing a shackle assembly and a steel structure, in which a procedure for connecting the steel structure to a hook of a crane by using the shack assembly is shown.

Two automated shackle assemblies according to the present invention, which are structured as described above, form one set and are assembled with both sides of a steel structure 110 as shown in FIG. 1, respectively. They are assembled with the steel structure 110, deliver it, and are separated therefrom. These operations will be described below.

Figure 4:
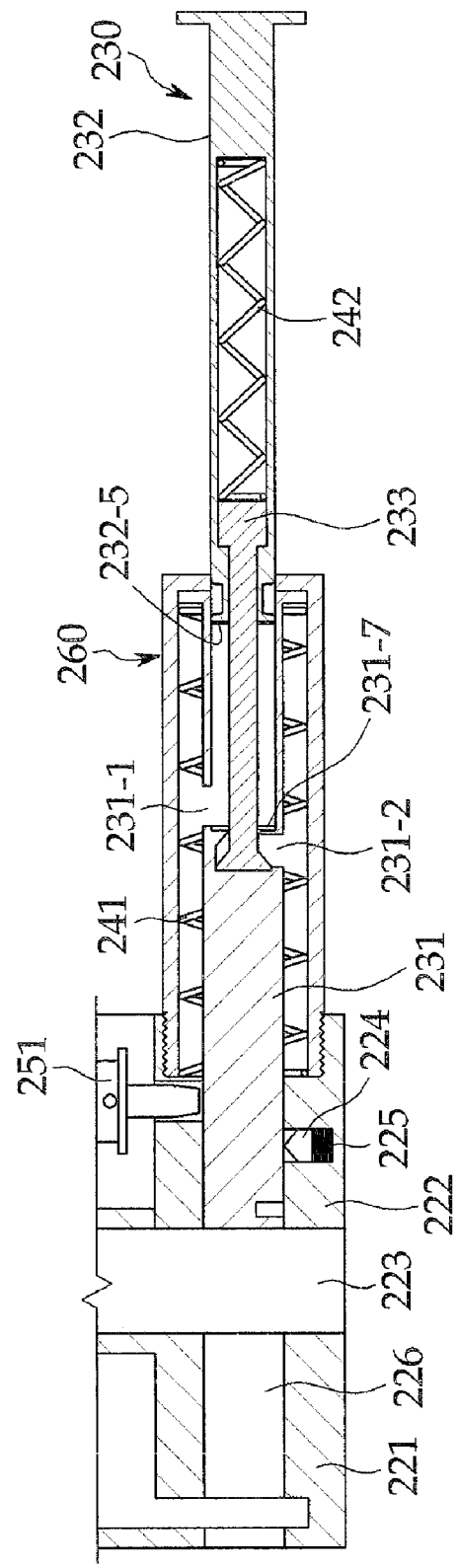
FIGS. 4 to 8 are section views of an automated shackle assembly according to an embodiment of the present invention, in which a procedure for opening and closing the automated shackle assembly is shown.

First, as shown in FIG. 4, in a state where the second shackle pin 232 protrudes out of the housing 260, and the first shackle pin 231 allows the open part 223 of the shackle body 220 to be opened, the open part 223 of the shackle body 220 is positioned at a supporting part of the steel structure, and the through-hole 226 extending through the first and second supporting parts 221 and 222 corresponds to a through-hole formed at the supporting part. At this state, the worker pushes the second shackle pin 232 in a direction where the open part 223 of the shackle body 220 is closed. Then, in a state where the first shackle pin 231 and the third shackle pin 233 are fixed, only the second shackle pin 232 moves in a left direction based on the drawing.

Figure 5:
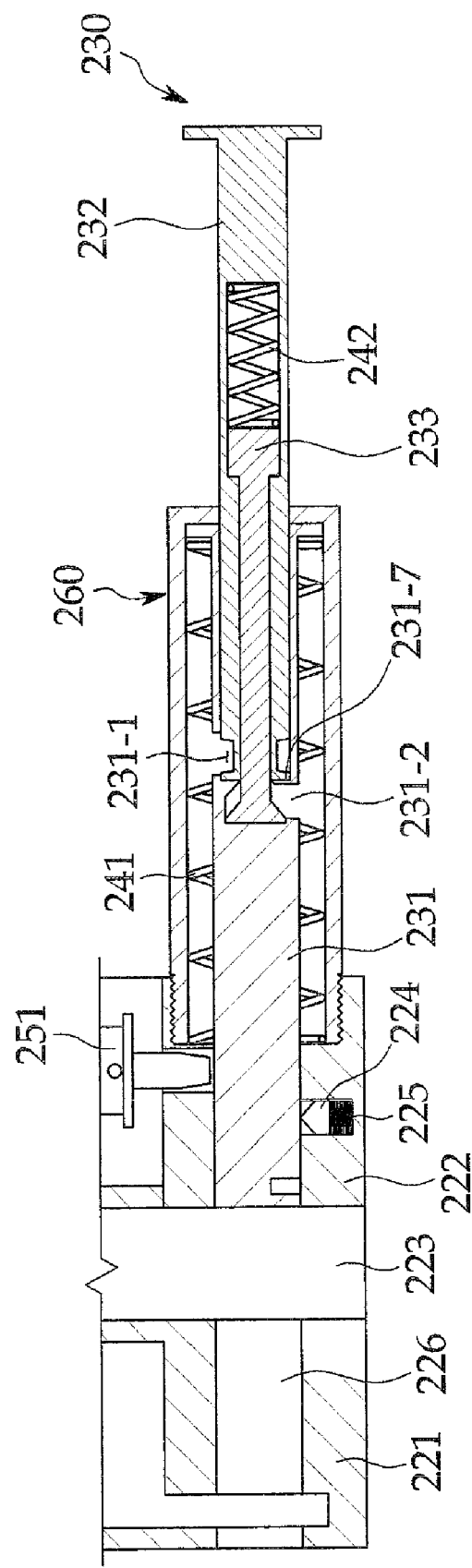

As a result, as shown in FIG. 5, the other end part 232-5 of the second shackle pin 232 makes close contact with the boundary part 231-7 of the first shackle pin 231 while the second elastic member 242 is compressed.

In this state, when the worker continuously pushes the second shackle pin 232 toward the left side, the first shackle pin 231 in close contact with the second shackle pin 232 moves in the left side integrally with the second shackle pin 232. At this time, the third shackle pin 233 arranged inside of the second shackle pin 232 moves in the left side integrally with the first and second shackle pins 231 and 232.

When the first, second, and third shackle pins 231, 232, and 233 move to the left side, and the open part 231-2 of the first shackle pin 231 is aligned with the protrusion 224 included in the second supporting part 222, the protrusion 224 protrudes to the upper side due to elastic force provided from the elastic member 225. As a result, the protrusion 224 is inserted into the second open part 231-2 of the first shackle pin 231 and is fixed in a state where the first shackle pin 231 has closed the open part 223.

Figure 6:
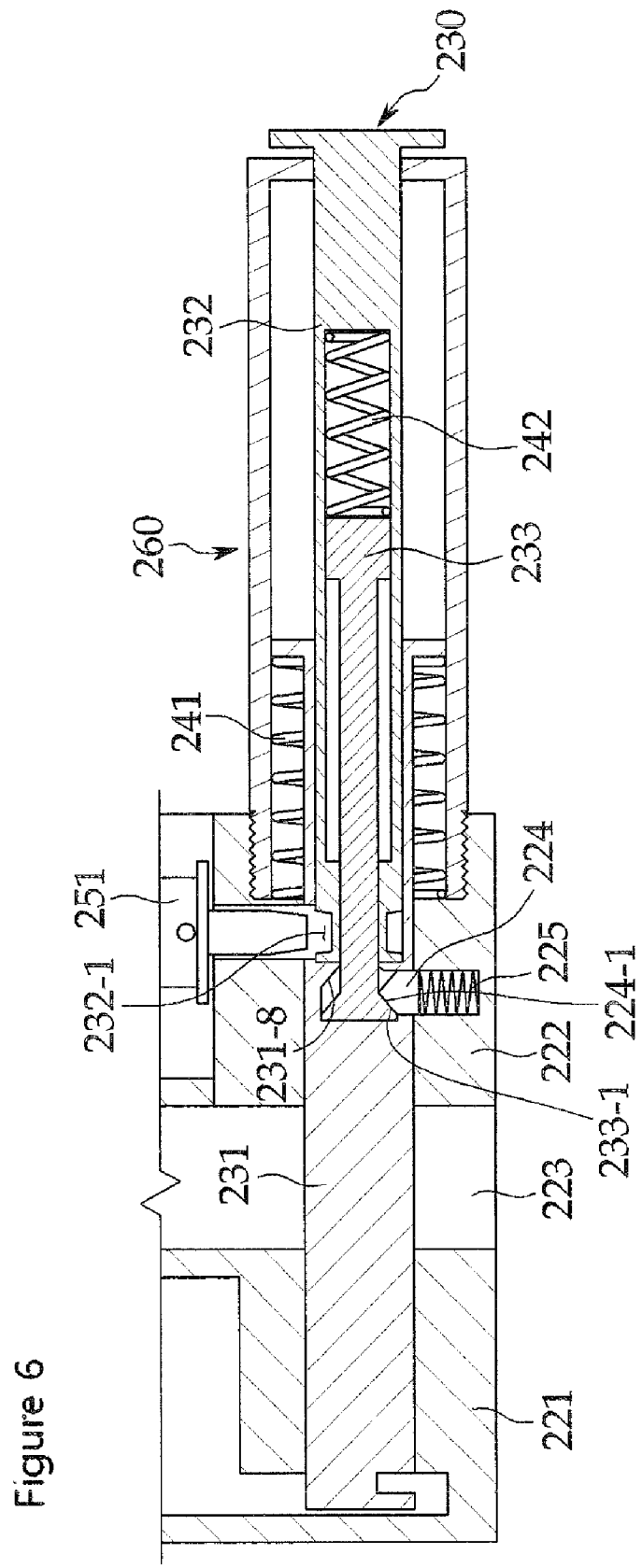

Meanwhile, as shown in FIG. 6, in this state, the first open part 231-1 of the first shackle pin 231 and the holding recess 232-1 of the second shackle pin 232 are vertically aligned with the position of the holding pin 251 of the vertical movement means 250.

In this state, when the holding pin 251 of the vertical movement means 250 moves downward due to restoration force of the elastic means (not shown), as shown in FIG. 7, the holding pin 251 extends through the first open part 231-1 of the first shackle pin 231 and is inserted into the holding recess 232-1 of the second shackle pin 232, thereby completing a fixing operation.

In this fixed state, the protrusion 224 relates to restoration force of the first elastic means 241 having elastic force, which is comparatively larger, and the holding pin 251 relates to restoration force of the second elastic means 242, which is comparatively smaller. Therefore, load to be given to the vertical movement means 250 becomes smaller.

In more detail, in order to smoothly release the shackle pin 230 from the shackle body 220 while overcoming frictional force between the shackle pin 230 and the connecting member 120 (see FIG. 1), a considerable amount of restoration force is required. If the holding pin independently bears the restoration force, load to be given to the vertical movement means 250 becomes significantly larger. In order to resolve this problem, the protrusion 224 relates to the large amount of restoration force, which is required for releasing the shackle pin 230, through the first shackle pin 231, and force required for releasing the protrusion 224 is obtained from elastic energy stored in the second elastic means 242. This releasing procedure will be described below in detail.

As such, when the shackle assembly 200 according to the present invention is completely assembled with the supporting part of the steel structure, a hook, etc. of a crane is hung on a hook hanger part (not shown), and the steel structure is delivered by operation the crane.

After the steel structure in such a state is delivered to a desired position, an operation of separating the shackle assembly 200 from the steel structure is performed as described below.

That is, in the fixed state shown in FIG. 7, the load applied to the first shackle pin 231 is removed, and power is supplied to the electric power supply means so as to move the holding pin 251 of the vertical movement means 250 upward. Therefore, the holding pin 251 is released from the holding recess 232-1 of the second shackle pin 232 so that connection between the vertical movement means 250 and the second shackle pin 232 is released, thereby forming a state shown in FIG. 6.

Figure 8:
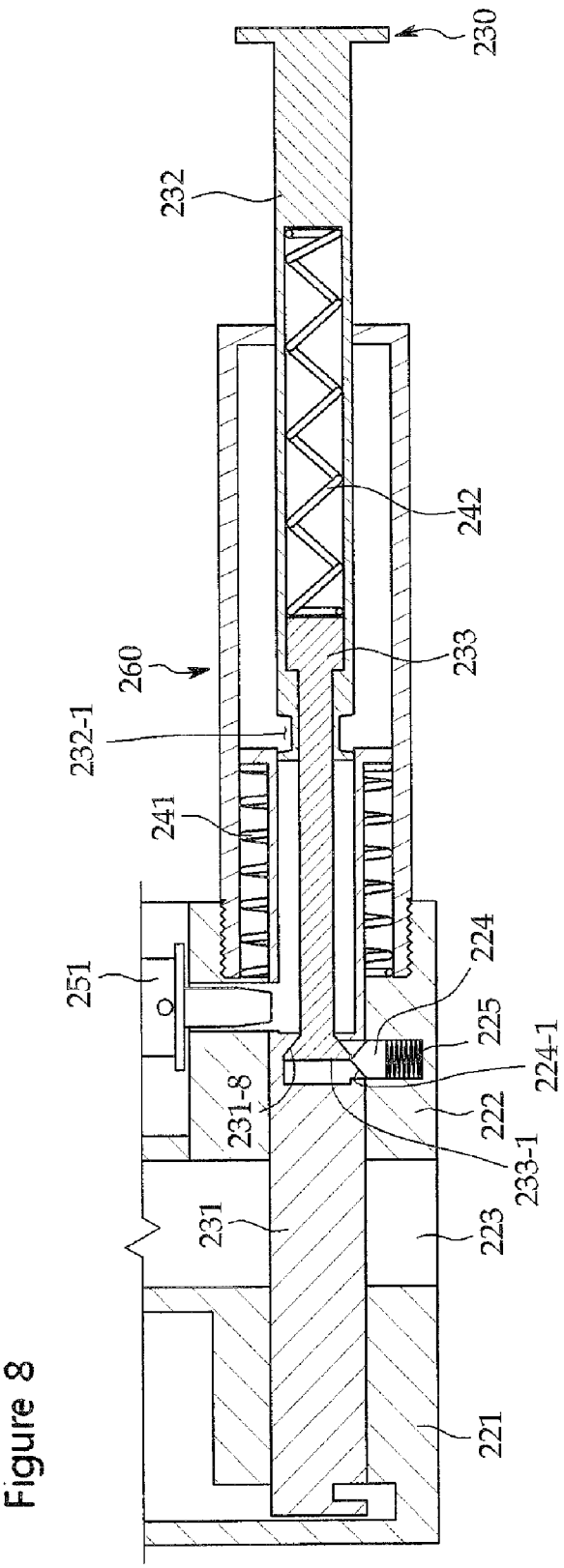

As shown in FIG. 6, when the holding pin 251 is released from the second shackle pin 232 receiving restoration force, which is comparatively small, from the second elastic means 242, the second shackle pin 232 moves outside of the housing 260 due to the restoration force provided from the second elastic means 242, thereby forming a state shown in FIG. 8.

When the second shackle pin 232 moves in the right direction by a predetermined distance, the stepped part 232-2 (see FIG. 10) of the second shackle pin 232 is engaged with the one end 233-3 (see FIG. 11) of the third shackle pin 233 so that movement of the second shackle pin 232 is restricted by the third shackle pin 233. At this time, the kinetic energy of the second shackle pin 232 is delivered to the third shackle pin 233, and due to this energy, the protrusion 244 is pushed to a lower side through the inclined surface 233-1 formed at the end of the third shackle pin 233 (see FIG. 8).

When the protrusion 224 moves downward to escape from the second open part 231-2 of the first shackle pin 231, the first shackle pin 231 returns to its original position due to strong elastic force provided from the first elastic means 241, i.e. to the right side so that the open part 223 of the shackle boy 220 is opened. As a result, an open state of the open part is formed as shown in FIG. 4. The movement of the first shackle pin 231 is restricted by the housing 260 so that the first shackle pin 231 is positioned as shown in FIG. 4.

Therefore, the shackle assembly 200 according to the present invention is completely separated from the supporting part of the steel structure. The shackle assembly 200 according to the present invention, which has been described above, is delivered to the walker positioned on the ground and is again used for the installation of other steel structure.

As described above, in the present invention, the protrusion 224 supports a supporting operation respective to the first elastic means 241 for providing a large amount of restoration force required for releasing the shackle pin 220, and as force required for releasing the protrusion 224, electric energy isn't used, but elastic energy stored in the second elastic means 242 through human power is used.

Meanwhile, as described above, restoration force of the second elastic means 242 is considerably smaller than the restoration force of the first elastic means 241, and the holding pin 251 of the vertical movement means 250 only relates to restoration force of the second elastic means 242. Therefore, burden given to the vertical movement means 250, which is required for controlling the second elastic means 242, is reduced, so that the structure of the shackle assembly can be simplified.

As described above, although the present invention has been shown and described with reference to certain exemplary embodiment thereof, it will be understood by those skilled in the art that the spirit and scope of the invention is not limited to the certain exemplary, and various changes in form and details may be made therein without departing from the spirit and scope of the invention. Therefore, the above described embodiment is provided to let those skilled in the art understand the scope of the present invention completely. Therefore, the embodiments has been described for illustrative purposes, and the scope of the invention is not to be limited by the above embodiments but by the claims and the equivalents thereof.

[Industrial Applicability]

According to the present invention, a plurality of shackle pins and a plurality of elastic means are included so that the load required for the vertical movement means and elastic force required for elastic means can be reduced.

That is, according to the present invention, the protrusion 224 supports the first elastic means 241 for providing a large amount of restoration force required for opening the shackle pin 230, and as force required for releasing the protrusion 224, electric energy isn't used, but elastic energy stored in the second elastic means 242 through human power is used.

Accordingly, the holding pin 251 of the vertical movement means 250 relates to a comparatively small amount of restoration force of the second elastic means 242 so that burden given to the vertical movement means 250, which is required for controlling the second elastic means 242, is reduced significantly. Therefore, the structure of the shackle assembly can be simplified. Also, impact force generated when the protrusion 224 is released by elastic energy provided from the second elastic means acts as force required for overcoming static friction force acting against the opening operation of the first shackle pin 231 so that the first elastic means 241 allows the first shackle pin 231 to perform an opening operation. Therefore, restoration force required in the first elastic means 241 can be reduced.

The invention claimed is:

1. An automated shackle assembly comprising:
a shackle body having an open part allowing a part of a steel structure to be inserted into the open part and to be supported by the shackle body;
a first shackle pin, which opens or closes the open part 223 in such a manner that the first shackle pin linearly moves while intersecting the open part of the shackle body so as to support the steel structure;
a first elastic member for providing elastic force required for opening the open part by the first shackle pin;
a protrusion for holding the first shackle pin in a closed state;
a second shackle pin, which makes contact with the first shackle pin so as to press the first shackle pin to close the open part 223 when the second shackle pin moves in a direction where the open part is closed;
a vertical movement member, which is arranged on the shackle body and is vertically movable, the vertical movement member passing through a first open part included in one side of the first shackle pin and being engaged with one side of the second shackle pin when the vertical movement member moves downward in a state where the open part has been closed in such a manner that the second shackle pin presses the first shackle pin, thereby maintaining the closed state of the open part, the vertical movement member releasing the closed state of the open part when the vertical movement member moves upward in the closed state of the open part;
a second elastic member for providing elastic force required for moving the second shackle pin in a direction where the open part is opened when the vertical movement member moves upward; and
a third shackle pin, which is arranged between the first shackle pin and the second shackle pin and receives force from the second shackle pin, which is moved by obtaining elastic energy provided from the second elastic member when the open part is opened, thereby releasing a held state of the protrusion.

2. The automated shackle assembly as claimed in claim 1, wherein a holding recess is included in one side of an end of the second shackle pin, and the holding recess and the first open part of the first shackle pin are aligned when the second elastic member is compressed, and
wherein the vertical movement member has a holding pin, which vertically moves and passes through the first open part to be engaged with the holding recess when the open part of the shackle body is closed by the first and second shackle pins or to be released from the holding recess.

3. The automated shackle assembly as claimed in claim 1, wherein the shackle body includes first and second supporting parts and a through-hole for allowing the first shackle pin to linearly move through the first and second supporting parts and,
wherein the second supporting part includes an elastic member for applying elastic force to the protrusion so as to allow the protrusion to protrude out of a lower part of the through-hole, and
wherein the first shackle pin includes a second open part, into which the protrusion is inserted by elastic force provide from the elastic member when the first shackle pin closes the open part of the shackle body.

4. The automated shackle assembly as claimed in claim 3, wherein an inclined surface is formed at one side of an end of the third shackle pin, and an inclined surface corresponding to the inclined surface of the third shackle pin is formed at the protrusion so that the inclined surface of the protrusion is engaged with the inclined surface of the third shackle pin when the protrusion passes through the second open part of the first shackle pin.

5. The automated shackle assembly as claimed in claim 3, further comprises an inclined surface at one end of the first shackle pin, the inclined surface being engaged with the inclined surface of the third shackle pin.

6. The automated shackle assembly as claimed in claim 1, further comprises a housing fixed in an outer side of the shackle body, the housing receiving the first shackle pin and the first elastic member and restricting movement of the first shackle pin, which is performed due to elastic force provided from the first elastic member.

7. The automated shackle assembly as claimed in claim 1, further comprises a control unit for controlling an electric power supply means according to a remote control signal from an outside.

* * * * *